2,714,929
Patented Aug. 9, 1955

United States Patent Office

2,714,929

SELECTIVE PLUGGING IN OIL WELLS

Theodore J. Nowak, Brea, and Paul W. Fischer, Whittier, Calif., assignors to Union Oil Company of California, Los Angeles, Calif., a corporation of California No Drawing. Application April 26, 1954, Serial No. 425,716

13 Claims. (Cl. 166—33)

This invention relates to an improved method for plugging subterranean formations penetrated by a well bore, and in particular concerns a method whereby the flow of water or brine from water- or brine-producing formations can be shut off without materially affecting the flow of oil from adjacent or co-extensive oil-producing formations.

In many of the petroleum producing areas of the United States the production of petroleum from subterranean oil-producing formations is accompanied by the production of water or brine. Well effluents comprising as much as 90 per cent of water and only 10 per cent of oil are by no means uncommon. Pumping the water to the earth's surface and separating it from the oil are not only expensive, but in many instances the problem of disposing of the waste water is more than one of mere economics. Among the various methods which have been proposed for overcoming these difficulties, those based on the concept of introducing into the water- and oil-producing formation or formations a liquid which is capable of condensing, polymerizing or otherwise reacting under the conditions prevailing within the formation to form a water-insoluble oil-soluble solid resin have attracted considerable attention and are fundamentally sound. From a practical standpoint, however, most of such methods are unsatisfactory in that the resinous solids which are formed within the oil-producing formations are not sufficiently oil-soluble to be readily dissolved out of such formations by the oil after the well has been put back on production. Consequently, while the treatment may effect substantially 100 per cent plugging of water-producing formations, it often reduces the permeability of oil-producing formations to an undue extent, often by as much as 70–80 per cent. Also, certain of the liquid plugging compositions tend to set up relatively rapidly under atmospheric conditions, and hence must be prepared immediately prior to use at the well site where it is seldom convenient.

It is accordingly an object of the present invention to provide an improved method for selectively plugging subterranean water- or brine-producing formations without materially affecting adjacent or co-extensive oil-producing formations.

Another object is to provide a selective plugging process in which the plugging agent is a resinous solid which need not necessarily be entirely oil-soluble.

A further object is to provide a means whereby resinous condensation products which are not entirely oil-soluble may be employed for selectively plugging water- or brine-producing formations adjacent to or coextensive with oil-producing formations.

Other and related objects will be apparent from the following detailed description of the invention, and various advantages not specifically referred to herein will occur to those skilled in the art upon employment of the invention in practice.

We have now found that the above and related objects may be realized by applying the principle of "residual saturation" to the formation of solid plugging agents within subterranean formations by the condensation of two liquid reactants. The term "residual saturation" is used to refer to the fact that it is impossible to displace entirely a liquid contained in a permeable solid with another liquid which is immiscible with the first. Thus, if oil is injected into a water-producing sand and water is subsequently passed through the sand, only a fraction of the injected oil will be displaced by the water and the original permeability of the sand with respect to water will be reduced. On the other hand, injection of oil into an oil-producing sand will not affect the oil-permeability thereof because of the miscibility of the injected oil with the indigenous oil. The extent to which the permeability of a water-producing sand with respect to the flow of water therethrough is reduced by the injection of oil into the sand is proportional to the quantity of oil retained in the sand, such quantity being termed the "residual oil saturation" and in turn is proportional to the viscosity of the oil. Unfortunately, the proportionality constants are not such that effective plugging of water-producing formations can be achieved by injecting viscous oils thereinto.

We have found, however, that if a liquid which is miscible with oil but immiscible with water is injected into formations producing both water and oil, and the formations are then allowed to produce their respective fluids, sufficient of such liquid is retained in the water-producing formations as residual saturation to form an effective water-insoluble resin therein upon the subsequent injection of a water-miscible oil-immiscible liquid which is capable of reacting with the first liquid to form such a resin. However, the resin is not formed within the oil-producing formations since the first liquid, being miscible with oil, is displaced from the oil-producing formations during the interim period when the formations are allowed to produce their respective fluids. The invention thus consists in the process which comprises introducing into a well bore, and thence into water- and oil-producing formations penetrated by the bore, a first liquid which is miscible with oil but immiscible with water, allowing said formations to produce their respective fluids, and thereafter introducing thereinto a second liquid which is miscible with water and immiscible with oil and which is capable of reacting with the first liquid to form a water-insoluble solid resin. The term "water," as used herein, includes aqueous salt brines such as commonly occur in oil fields. It is desirable, of course, that the solid resin be as oil-soluble as possible but since the process of the invention does not particularly depend upon differential solubilities of the resin in oil and water, it is not inoperable where the resin is relatively insoluble in oil. The present invention is thus distinguished from those of the prior art wherein a single resin-forming liquid, or aqueous dispersion thereof, is injected into subterranean formations and allowed to set up therein to form a water-insoluble oil-soluble resin which is subsequently displaced from the oil-producing formations by the production of oil therefrom.

A number of water-insoluble resins are known which can be formed by a condensation reaction between two liquids which have reversed miscibilities with respect to oil and water. For example, water-insoluble phenol-aldehyde resins are readily formed by the condensation of an oil-miscible phenol with a water-soluble aldehyde under the influence of alkaline or acid catalysts at the temperatures which prevail in subterranean formations. They may also be formed by reaction between an oil-soluble aldehyde and an aqueous solution of a phenol. Usually, however, it is preferred that the phenol be oil-soluble and the aldehyde be water-soluble. For the most part the oil-soluble phenols which form resins having some degree of oil-solubility are those which have one or more alkyl groups containing a total of at least 2, and preferably at least 5, carbon atoms substituted as the aromatic nucleus, e. g. 2-ethylphenol, 4-ethylphenol, 2-tert.-butylphenol, 5-tert.-butylcresol, 2,5-di-isopropylphenol, 4-amylphenol, 2-hexylphenol, 4-octylphenol, 2-octodecylphenol, 2,3-xylenol, tert.-amylnaphthol, etc. Where it is not considered essential that the resin be particularly oil-soluble, o- and para-cresols and even phenol itself may be employed. Many of the foregoing classes of phenols are solids at well bore temperatures, but they may be employed in the form of solutions which are immiscible with water, e. g., in the form of solution in a light oil such as kerosene. Since the amount of the phenolic liquid which is retained as residual saturation in the water-producing formation is proportional to the viscosity of such liquid, the latter should be as viscous as possible within the limitations imposed by the mechanical difficulties in forcing liquids into subterranean formations. Mixtures of phenols are also operable, and in fact are often preferred since mixtures are frequently liquids even though their individual components are normally solids. A particularly suitable mixture of this type is the phenolic product obtained by the hydrogenation of coal, marketed by the Carbide and Carbon Chemical Company under the name "High Boiling Phenol." This product is a relatively mobile liquid, boiling at about 240°–270° C. and comprising 3,5-dialkylphenols and indanols. Mixtures of phenols which ordinarily do not form oil-soluble resins, e. g., phenol and the cresols, with phenols which do form such resins, e. g., 4-octylphenol and 4-dodecylphenol, may also be advantageously employed.

When it is desired to employ the phenolic material as the water-miscible liquid, any of the foregoing phenols may be dissolved in an aqueous solution of an alkali, e. g., sodium hydroxide, to form such a liquid. The alkali will serve as a catalyst for the condensation reaction.

The water-miscible aldehydes which may be employed in conjunction with the foregoing oil-miscible phenols include formaldehyde, acetaldehyde and propionaldehyde, and the formaldehyde congeners, paraformaldehyde and hexamethylenetetramine. Formaldehyde in the form of its 40% aqueous solution known as formalin is ordinarily preferred. Oil-soluble aldehydes such as furfural and paraldehyde (polymerized acetaldehyde) may be employed in conjunction with the water-miscible phenols.

As previously stated, the condensation reaction between phenols and aldehydes readily occurs at well bore temperatures under the influence of alkaline or acid catalysts. Sodium hydroxide is usually preferred as an alkaline catalyst, and mineral acids, e. g., sulfuric or hydrochloric acid, may be employed as acid catalysts. These catalysts, being soluble in water, are combined with the water-miscible liquid. Should it be desired to combine the catalyst with the oil-miscible liquid, oil-soluble acids such as petroleum sulfonic acids, benzene sulfonic acid, toluene sulfonic acid, etc. should be employed.

Since the phenol-aldehyde resins are relatively cheap and a great deal is known about their formation by reaction between a wide variety of phenolic materials, aldehydes and catalysts, the present process will undoubtedly find its greatest applicability in connection with selective plugging with this type of resin. However, the principle of the process does not depend upon the identity of the resin or its congeners except to the extent that the resin must be one which is water-insoluble and is formed by reaction between an oil-miscible water-immiscible liquid and a water-miscible oil-immiscible liquid. Accordingly, the process is equally applicable to plugging with such resin-forming systems as urea-formaldehyde, thiourea-furfural, urethane-furfural, diethylene glycol-maleic anhydride, ethylene glycol-phthalic anhydride, lignosulfonate-aldehyde, and the like.

In general, the manipulative steps involved in carrying out the present process comprise first filling the well with an oil-immiscible fluid such as water, brine or aqueous drilling mud to exert a back pressure on the water- and oil-producing formation penetrated by the well and prevent the flow of fluids therefrom. The oil-miscible component of the resin-forming system, which may contain the catalyst, is introduced into the well tubing and is followed by a charge of water or other oil-immiscible inert fluid. Pressure is applied to force the two liquids down the tubing while recovering the displaced water, mud or other fluid from the annulus between the well casing and tubing. When the oil-miscible component of the resin-forming system arrives at the formations which are to be treated, the well annulus is closed at the surface and pressure is applied to the tubing to force said component out into said formations. The amount of such component to be forced into the formations in this manner will depend upon the interval being treated, the desired extent of penetration into the formations, and the porosity of the formations, and can readily be calculated from these values. When the injection has been completed the well is pumped out and is placed on production, i. e., the formations are allowed to produce in the usual manner, until such time as the well effluent is more or less free from the liquid which has been injected into the formations. Such time will depend upon a variety of factors, including the permeability of the producing formations, the viscosity of the injected liquid, the well pressure, etc., but can readily be ascertained by simple chemical analysis of the well effluent. As previously explained, during this interim production period the injected liquid will be substantially completely displaced from the oil-producing formations but will be retained within the water-producing formations because of the residual saturation phenomenon. When the well effluent is more or less free from the injected component the well is filled with a water-immiscible fluid such as oil or an oil-base drilling mud, and the water-miscible component of the resin-forming system is forced down the well tubing and into the formation as before. Unless the catalyst has been included in the previously injected oil-miscible component of the resin-forming system it should be included in the water-miscible component. If desired, each of the components may contain part of the catalyst. When the second injection has been completed the well is maintained under pressure for a period of time sufficient for the second injected liquid to react with the oil-miscible component which is retained in the water-producing formation as residual saturation. Such length of time will depend upon the identity of the two liquids and the prevailing temperature, but is usually between about 4 and about 48 hours. The pressure is then released and the well is placed in production.

As will be apparent to those skilled in the art, various techniques may be employed for successively introducing the two components of the resin-forming system into the formation, and any of the well-known methods for forcing liquids into subterranean formations may be employed. Thus, the liquids may be confined to the formations selected for treatment by the use of packers set between the tubing and the casing rather than by a charge of inert liquid maintained in the well annulus, and the fluid employed to transmit pressure from the well-head to the liquid being forced into the formation may be of the so-called "non-penetrating" type, e. g., a colloidal suspension of bentonite or starch. The invention lies, not in the use of any particular manipulative techniques or resin-forming systems, but in the concept of forming a water-insoluble solid within water-bearing formations by reaction of an oil-miscible liquid retained in such formations as residual saturation with a water-miscible liquid introduced therein.

The following examples will illustrate the extent of the selective plugging achieved by practice of the process of the invention, but are not to be construed as limiting the invention.

Example I

Two Ohio sandstone core samples, 1″ in diameter and 2″ long, were leached with dilute hydrochloric acid to remove iron compounds, and were washed with distilled water and dried. A simulated water-bearing sand was prepared by saturating one of the cores (designated core No. 1) with 3% aqueous sodium chloride. This core was found to have an initial permeability ($K_0$) of about 290 md. at 190° F. A simulated oil-bearing sand was prepared by saturating the other core (designated core No. 2) with 3% aqueous sodium chloride and thereafter flowing kerosene lengthwise through the core under a differential pressure of 600 p. s. i. The kerosene employed had solvent characteristics substantially identical to those of crude petroleum. The initial permeability ($K_0$) of the simulated oil-bearing sand was 223 md. at 190° F. Approximately 5 pore-volumes of a mixture of meta- and para-cresol were then passed through each core under a differential pressure of 25 p. s. i., after which core No. 1 was backflowed with 3% aqueous sodium chloride and core No. 2 was backflowed with kerosene. Both backflowing operations were at 100 p. s. i. differential pressure. Approximately 2 pore-volumes of a mixture containing about 97 parts by weight of formalin and 3 parts by weight of aqueous sodium hydroxide (50° Bé.) were then passed through each core at a differential pressure of 25 p. s. i., and the cores were allowed to stand for about 48 hours at about 190° F. Core No. 1 was then backflowed with 3% aqueous sodium chloride at a differential pressure of 100 p. s. i., and core No. 2 was backflowed with kerosene at the same pressure. The permeabilities ($K_x$) of the two cores were then determined to be 26 md. and 295 md., respectively. The permeability recoveries are calculated as $\frac{K_x}{K_0} \times 100$ = percent permeability recovery = 9.2% for core No. 1

= 132% for core No. 2

The selectively factor, which is the ratio of the permeability recovery of the oil-bearing sand to the permeability recovery of the water-bearing sand, was 14.4.

It will be noted that the permeability of the oil-bearing sand was actually increased by the treatment. This is considered to be due to the walls of the interstices of the oil-bearing sand becoming coated with a thin layer of the resin and thereby being rendered preferentially oil wettable. As for the water-bearing sand, the data show that the treatment effected the plugging thereof to an extent of better than 90%.

Example II

The procedure of Example I was followed, employing furfural as the first injected oil-miscible liquid, and a mixture consisting of 40 parts by weight of ammonium lignin sulfonate (Crown Zellerbach "Urzon"), 100 parts by weight of water and 2 parts by weight of concentrated sulfuric acid as the second injected water-miscible liquid. The following data were obtained:

|  | Water-Bearing Sand | Oil-Bearing Sand |
| --- | --- | --- |
| $K_0$ | 281 | 134.2 |
| $K_x$ | 9.4 | 65.7 |
| Permeability Recovery, Percent | 3.3 | 49 |

Selectivity Factor = 14.8.

Example III

Two experiments were carried out in which the two components of each of the resins employed in the two preceding examples were admixed to form a single liquid which was forced through the water- and oil-bearing cores, after which the cores were allowed to stand for about 48 hours at 190° F. In both instances, the reduction of the permeability of the oil-bearing sand was substantially the same as that of the water-bearing sand, i. e., the selectivity factor in each case was substantially 1.

Other modes of applying the principle of our invention may be employed instead of those explained, change being made as regards the materials or methods employed, provided the step or steps stated by any of the following claims, or the equivalent of such stated step or steps, be employed.

We therefore particularly point out and distinctly claim as our invention:

1. The method of selectively plugging oil- and water-producing formations penetrated by a well bore to decrease the production of water therefrom which comprises forcing into said formations an oil-miscible water-immiscible first liquid which is capable of reacting with a water-miscible oil-immiscible second liquid under the conditions of temperature and pressure prevailing in said formations to form a substantially water-insoluble solid, allowing said formations to produce until the effluent therefrom is substantially free from the injected first liquid, forcing said water-miscible oil-immiscible second liquid into said formations, and holding said second liquid within said formations until said substantially water-insoluble solid is formed within said water-producing formations by reaction between said second liquid and said first liquid retained in said water-producing formations as residual saturation.

2. The process of claim 1 wherein the said first liquid comprises an oil-soluble phenol and the said second liquid comprises a water-soluble aldehyde, and at least one of said liquids also comprises a phenol-aldehyde condensation catalyst.

3. The process of claim 1 wherein the said first liquid comprises an oil-soluble aldehyde, and the said second liquid comprises an aqueous alkaline solution of a phenol.

4. The process of claim 1 wherein the said first liquid comprises an oil-soluble alkylated phenol containing a total of at least 5 side-chain carbon atoms, and said second liquid comprises an aqueous solution of a water-soluble aldehyde and a water-soluble phenol-aldehyde condensation catalyst.

5. The process of claim 1 wherein said first liquid is an oil-soluble phenol, and said second liquid is an aqueous alkaline solution of formaldehyde.

6. The process of claim 1 wherein said first liquid is an oil-soluble phenol, and said second liquid is an aqueous acidic solution of formaldehyde.

7. The process of claim 1 wherein said first liquid comprises mixed cresols and said second liquid comprises an aqueous alkaline solution of formaldehyde.

8. The method of selectively plugging oil- and water-producing formations penetrated by a well bore to decrease the production of water therefrom which comprises introducing into said well bore an oil-miscible water-immiscible first liquid which is capable of reacting with a water-miscible oil-immiscible second liquid under the temperature and pressure conditions prevailing in said formations to form a water-insoluble solid, applying pressure to said well bore to force said first liquid into said formations, releasing said pressure and allowing said formations to produce until the said formations are substantially free from said first liquid except the amount thereof retained in said water-producing formations as residual saturation, introducing into said well bore said water-miscible oil-immiscible second liquid, applying pressure to said well bore to force into said formations sufficient of said second liquid to react with the first liquid retained in said water-producing formations as residual saturation to form said water-insoluble solid, maintaining said well bore under pressure for a period of time sufficient for said reaction to occur, and thereafter releasing said pressure and withdrawing well fluids from the bore.

9. The process of claim 8 wherein said first liquid comprises an oil-soluble phenol and said second liquid comprises a water-soluble aldehyde, and at least one of said liquids comprises a phenol-aldehyde condensation catalyst.

10. The process of claim 8 wherein said first liquid comprises an oil-soluble aldehyde, and said second liquid comprises an aqueous alkaline solution of a phenol.

11. The process of claim 8 wherein said first liquid comprises an oil-soluble alkylated phenol containing a total of at least 5 side-chain carbon atoms, and said second liquid comprises an aqueous solution of a water-soluble aldehyde and a water-soluble phenol-aldehyde condensation catalyst.

12. The process of claim 8 wherein said first liquid comprises mixed cresols, and said second liquid comprises an aqueous alkaline solution of formaldehyde.

13. The process of claim 8 wherein said first liquid comprises an oil-soluble aldehyde, and said second liquid comprises an aqueous acidic solution of a lignin sulfonate.

References Cited in the file of this patent

UNITED STATES PATENTS

| | | |
|---|---|---|
| 2,258,000 | Chamberlain | Oct. 7, 1941 |
| 2,366,036 | Leverett et al. | Dec. 26, 1944 |
| 2,378,817 | Wrightsman et al. | June 19, 1945 |
| 2,670,048 | Menaul | Feb. 23, 1954 |